(12) United States Patent
Sakai

(10) Patent No.: US 7,483,076 B2
(45) Date of Patent: Jan. 27, 2009

(54) PORTABLE ELECTRONICS DEVICE SUPPORT SYSTEM

(75) Inventor: Masayuki Sakai, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 630 days.

(21) Appl. No.: 11/098,487

(22) Filed: Apr. 5, 2005

(65) Prior Publication Data

US 2005/0221872 A1 Oct. 6, 2005

(30) Foreign Application Priority Data

Apr. 6, 2004 (JP) ............................. 2004-112519

(51) Int. Cl.
*H04N 5/225* (2006.01)
(52) U.S. Cl. .................... 348/375; 455/575.1
(58) Field of Classification Search ................ 348/373, 348/375, 372; 455/575, 556, 90, 550; 396/434, 396/429
See application file for complete search history.

(56) References Cited

U.S. PATENT DOCUMENTS 5,606,341 A * 2/1997 Aguilera ..................... 345/87
6,404,623 B1 * 6/2002 Koshika ..................... 361/681
2001/0010550 A1 * 8/2001 Saito et al. .................. 348/233
2002/0140667 A1 * 10/2002 Horiki ........................ 345/156
2005/0207743 A1 * 9/2005 Uehara ........................ 396/50

FOREIGN PATENT DOCUMENTS

JP 2004-056354 A 2/2004

* cited by examiner

*Primary Examiner*—Lin Ye
*Assistant Examiner*—Amy Hsu
(74) *Attorney, Agent, or Firm*—Birch, Stewart, Kolasch & Birch, LLP

(57) ABSTRACT

An electronic camera comprises a flat-shaped camera body and a circular hook portion. The camera body includes an LCD, a rechargeable battery, a memory, a controller and so forth. The hook portion protrudes from the camera body toward the outside thereof. A cradle comprises a projection with which the hook portion engages so that it is possible to suspend the electronic camera from the cradle attached to a wall. In this state, the cradle feeds power to the electronic camera, and data of image data and so forth is bi-directionally transferred between them. The cradle is provided with a large-capacity storage part for recording the data transferred from the electronic camera.

14 Claims, 4 Drawing Sheets

PORTABLE ELECTRONICS DEVICE SUPPORT SYSTEM

BACKGROUND OF THE INVENTION

1. Field of the Invention

The present invention relates to a portable electronics device support system comprising a portable electronics device of an electronic camera and so forth, and a cradle for providing support to the portable electronics device, for example, providing electricity thereto.

2. Description of the Related Art

Electronic cameras are widely used as imaging devices. In such an electronic camera, subject light is taken by a solid-state imaging device of a CCD image sensor and so forth. The taken subject light is converted into a digital image data to be stored in a storage medium of a built-in memory, a memory card and so forth. Recently, a rechargeable battery is incorporated into a portable electronics device of the electronic camera and so forth. The rechargeable battery of the portable electronics device is easily charged by merely placing this device on a cradle (see Japanese Patent Laid-Open Publication No. 2004-56354, for instance). In addition, it is possible to perform data communication between the portable electronics device and the cradle.

However, as to the electronic camera and the cradle, the electronic camera is adapted to be placed on a concave portion of the cradle. Thus, it is necessary to settle the cradle on a desk or the like so that the place for settling the cradle is limited to a flat surface of the desk and so forth.

SUMMARY OF THE INVENTION

In view of the foregoing, it is a primary object of the present invention to provide a portable electronics device support system in which a portable electronics device of an electronics camera and so forth having excellent installation properties is supported by a cradle.

In order to achieve the above and other objects, the portable electronics device support system according to the present invention comprises a portable electronics device and a cradle. The portable electronics device has a flat body and a hook portion protruding from the body toward the outside thereof. The body is provided with at least a display, a rechargeable battery, a memory and a controller. The cradle includes a projection with which the hook portion engages. The cradle is capable of charging the rechargeable battery and performing bi-directional data communication with the portable electronics device regarding data to be reproduced on the display.

In a preferable embodiment, the cradle further includes a storage part for storing the data transferred from the portable electronics device by the data communication, and this storage part has much larger capacity than the memory of the portable electronics device.

It is preferable that a power cable is connected with the cradle and electric power is supplied thereto via the power cable.

It is preferable that the portable electronics device includes an attitude detector for detecting an attitude thereof. A reproducing operation of an image reproduced on the display is controlled in accordance with the attitude detected by the attitude detector.

Further, it is preferable that the periphery of the display is surrounded by a shock absorber.

According to the portable electronics device support system of the present invention, it is possible to suspend the portable electronics device from the cradle attached to a wall so that installation is improved. Moreover, the portable electronics device is charged by the cradle, and the data communication is performed between them. Thus, it is possible to reproduce the image on the display in the state that the portable electronics device is suspended from the cradle, and it is possible to view the image in this state.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
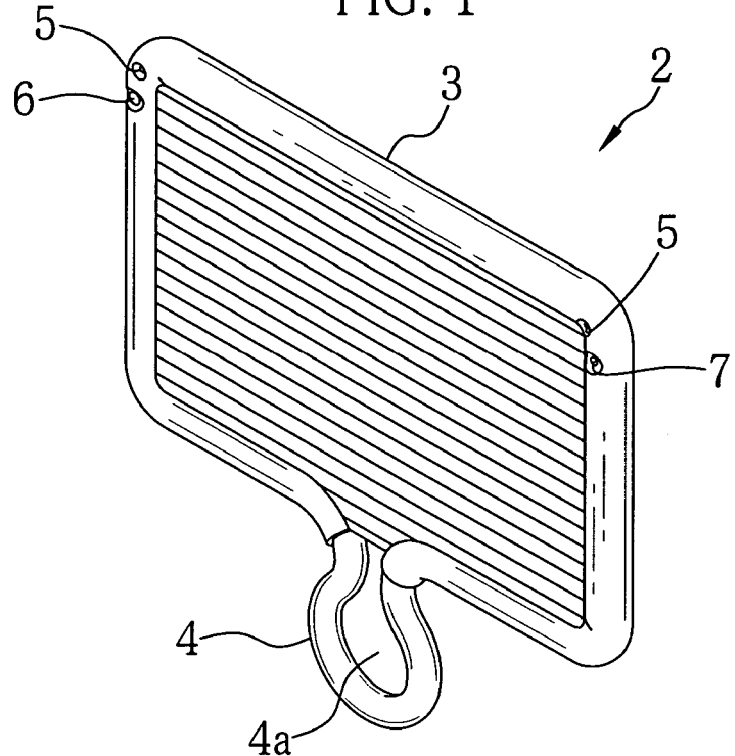
FIG. 1 is a perspective view showing a front side of an electronic camera.
Figure 2:
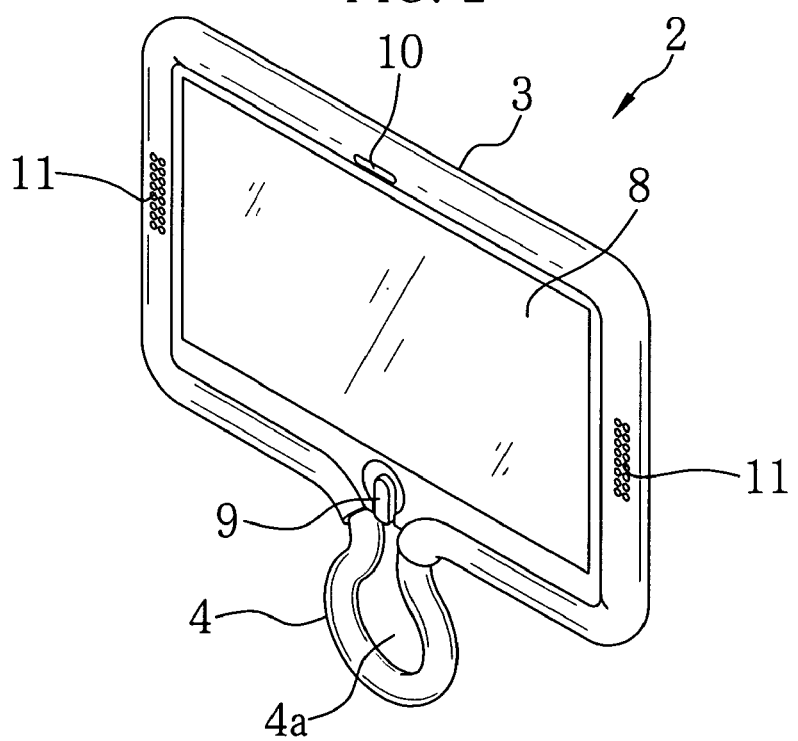
FIG. 2 is a perspective view showing a rear side of the electronic camera.

In FIGS. 1 and 2, an electronic camera 2 according to the present invention comprises a camera body 3 having a rectangular flat shape, and a hook portion 4 integrally formed with the camera body 3. The hook portion 4 is disposed so as to protrude from a lower central portion of the camera body 3, and is formed by circularly bending a metal rod of brass and so forth. The hook portion 4 has an opening area 4a whose penetrating direction is substantially perpendicular to front and rear surfaces of the camera body 3.

As shown in FIG. 1, the front of the camera body 3 is provided with a pair of microphones 5, an imaging portion 6 and an LED 7. The microphones 5 are respectively disposed at both sides of an upper portion of the camera body 3 to record surrounding sound. The imaging portion 6 is disposed under the left microphone 5 so as to be adjacent thereto. The imaging portion 6 performs shooting of a subject. The LED 7 is disposed under the right microphone 5 so as to adjacent thereto. The LED 7 is turned on when a power is supplied from a built-in rechargeable battery, and the LED 7 is turned off when the power is not supplied. The front of the camera body 3 is almost covered with an opaque plastic.

As shown in FIG. 2, the rear of the camera body 3 is provided with a liquid crystal display (LCD) 8, an operation button 9, a power button 10, and a pair of speakers 11. The LCD 8 is a rectangular flat panel for displaying image data and a menu picture. The LCD 8 occupies a majority of the rear of the camera body 3. Incidentally, the LCD 8 is surrounded by a shock absorber of a soft rubber and so forth.

The operation button 9 is disposed under the LCD 8 of the camera body 3 and above the hook portion 4 to enable various setting operations, for instance, a shutter release operation of the imaging portion, a zooming operation of a lens, a switching operation of a still-image shooting mode and a moving-image shooting mode. The power button 10 is disposed above the LCD 8 to enable an on-off operation for supplying the power from the built-in rechargeable battery. The speakers 11 are disposed at both sides of the LCD 8 to output the sound recorded by the microphones 5. Incidentally, an EL display and so forth may be used instead of the LCD 8.

Figure 3:
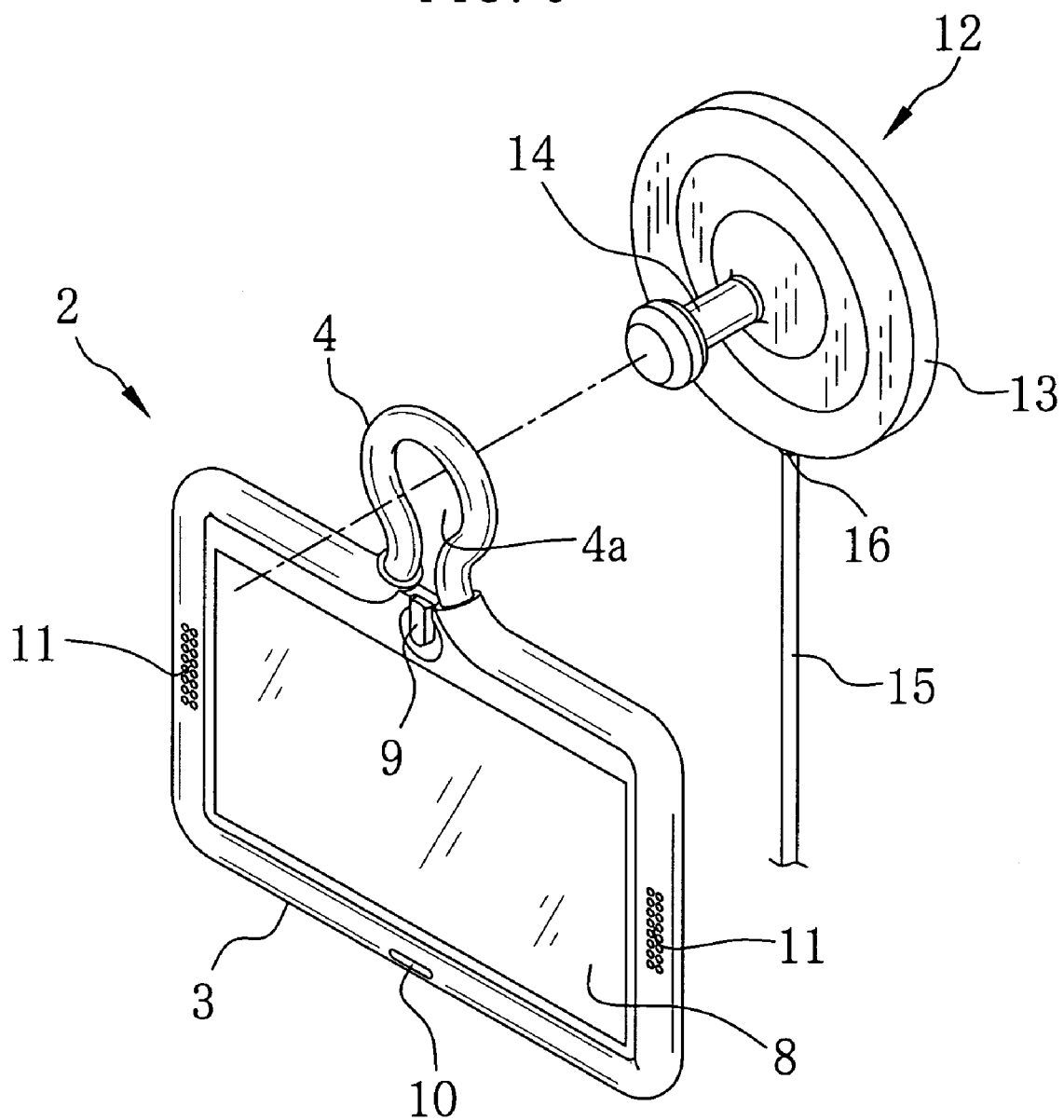
FIG. 3 is a perspective view showing a portable electronics device support system comprising the electronic camera and a cradle.

FIG. 3 shows a portable electronics device support system comprising the electronic camera 2 and a cradle 12. This cradle 12 includes a disk-shaped cradle body 13 and a cylindrical projection 14 protruding from a central portion of the front of the cradle body 13. The hook portion 4 of the electronic camera 2 is hitched around the projection 14 to engage therewith. A top portion of the projection 14 becomes large to prevent the engaging hook portion 4 from dropping. The rear of the cradle body 13 is used for attachment to a wall and so forth.

The cradle 12 works as a charger of a non-contact electromagnetic induction type, which charges the electronic camera 2 in a state that the electronic camera 2 is suspended by the projection 14. In addition, the cradle 12 has a storage function for storing data read from the electronic camera 2, and an output function for externally outputting the stored data to reproduce this data with the electronic camera 2. A lower end of the cradle body 13 is provided with a connector 16 to which one end of a power cable 15 is detachably connected. The other end of the power cable 15 is connected to an external power source.

Figure 4:
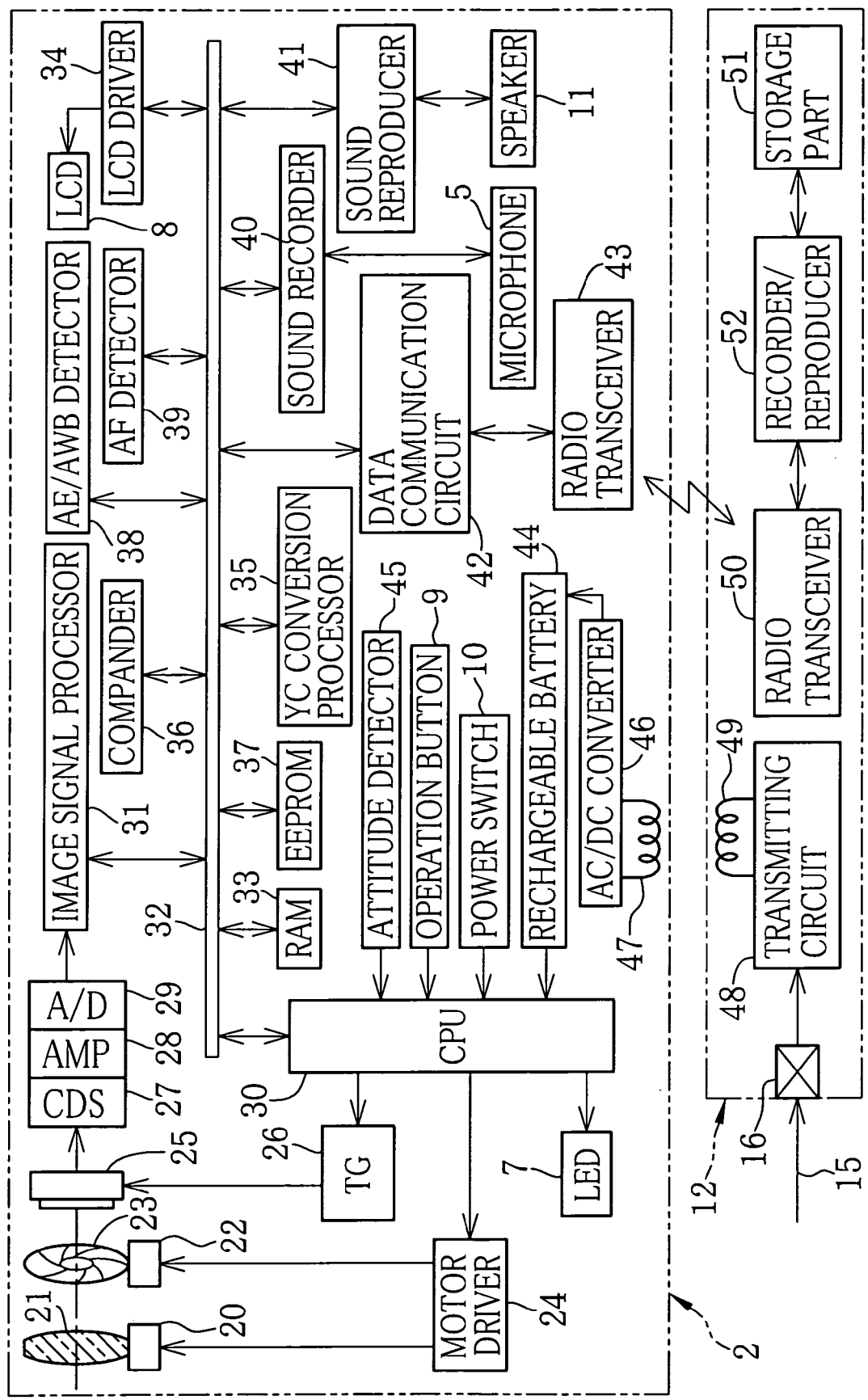
FIG. 4 is a block diagram showing an electrical structure of the portable electronics device support system.

FIG. 4 shows an electrical structure of the portable electronics device support system. The imaging portion 6 of the electronic camera 2 is constituted of a taking lens 21 connected to a lens motor 20, a stop 23 connected to an iris motor 22, a motor driver 24, a CCD 25, a timing generator (TG) 26, a correlation double sampling circuit (CDS) 27, an amplifier (AMP) 28, and an A/D converter (A/D) 29. Incidentally, the taking lens 21 is exposed at the front of the camera body 3.

The lens motor 20 moves a zoom lens of the taking lens 21 to a wide-angle side or to a telephoto side in association with a zooming operation of the operation button 9. Moreover, the lens motor 20 moves a focus lens of the taking lens 21 in accordance with a subject distance and a variable power of the zoom lens to adjust a focal point by which shooting conditions become optimum. The iris motor 22 actuates the stop 23 to adjust exposure.

Behind the taking lens 21, is disposed a CCD 25 for receiving a subject light having passed through the taking lens 21. The CCD 25 is connected to the TG 26 controlled by a controller (CPU) 30. A shutter speed of an electronic shutter is determined on the basis of a timing signal (clock pulse) inputted from the TG 26. Incidentally, a MOS image sensor may be employed instead of the CCD 25.

An image pickup signal outputted from the CCD 25 is inputted into the correlation double sampling circuit (CDS) 27. And then, the image pickup signal is outputted as image data of R, G and B accurately corresponding to accumulated charge amounts of respective pixels of the CCD 25. The image data outputted from the CDS 27 is amplified by the amplifier (AMP) 28 and is converted into digital image data by the A/D 29.

The image data outputted from the A/D 29 is inputted into an image signal processor 31 to perform various image processes of gradation conversion, white balance correction, gamma correction and so forth. The image data outputted from the image signal processor 31 is temporarily stored in a RAM 33 connected via a bus 32. The image data is displayed on the LCD 8 via an LCD driver 34 as a through image. The LCD 8 works as an electronic viewfinder.

A YC conversion processor 35 reads the image data, for which the various image processes have been performed by the image signal processor 31, from the RAM 33 to convert this data into a brightness signal Y and color-difference signals Cr and Cb. The converted image data is compressed by a compander 36 in JPEG compression format. The compressed image data is stored in an EEPROM 37, which is a nonvolatile internal memory. At this time, under the still-image shooting mode, still image data is compressed by the compander 36 and is stored in the EEPROM 37. In contrast, under the moving-image shooting mode, moving image data is compressed by the compander 36 and is stored in the EEPROM 37. Incidentally, the image data of each frame constituting the moving image data is compressed so that the moving image data is formed in motion JPEG format in which independent JPEG images are successive. Meanwhile, at the time of reproduction, the still image data or the moving image data stored in the EEPROM 37 is expanded by the compander 36 and is displayed on the LCD 8 via the LCD driver 34.

An AE/AWB detector 38 detects whether an exposure amount is proper or not for shooting. The exposure amount means the shutter speed of the electronic shutter and a value of the stop 23 represented by an f-number and so forth. Further, the AE/AWB detector 38 detects whether white balance is proper or not for shooting. An AF detector 39 detects whether the focal point of the taking lens 21 is properly adjusted or not. The detectors 38 and 39 send the detection results to the CPU 30 via the bus 32 whenever the operation button 9 is pressed by half under a shutter release mode. The CPU 30 controls the taking lens 21, the stop 23 and the CCD 25 on the basis of the detection results sent from the respective detectors 38 and 39.

A sound recorder 40 converts the sound, which is obtained by the microphones 5, into digital sound data by A/D conversion. After that, the sound recorder 40 records the sound data in the EEPROM 37 so as to relate this sound data to the image data. At the time of reproducing the moving image, a sound reproducer 41 performs D/A conversion for the sound data, which is recorded in the EEPROM 37, to output the sound from the speaker 11.

A data communication circuit 42 is connected to a radio transceiver 43. The data communication circuit 42 is controlled by the CPU 30 to read the image data and the sound data from the EEPROM 37 via the bus 32. The radio transceiver 43 converts the read data into a radio signal and sends this radio signal to the cradle 12.

The CPU 30 is connected to a rechargeable battery 44 and an attitude detector 45 besides the LED 7, the operation button 9 and the power button 10. The rechargeable battery 44 is an internal power source, and the attitude detector 45 detects an attitude of the electronic camera 2. The rechargeable battery 44 is connected to an AC/DC converter 46 to which a secondary coil 47 is connected. The secondary coil 47 is built in the hook portion 4 and generates electromotive force upon reception of an alternating magnetic field generated by the cradle 12. The electromotive force is converted from AC to DC by the AC/DC converter 46. The converted DC power is supplied to the rechargeable battery 44 to charge this battery 44. Incidentally, the power supplied from the rechargeable battery 44 to the CPU 30 is turned on and off in accordance with the operation of the power button 10, and the LED 7 is turned on and off in association therewith.

The attitude detector 45 is an attitude detecting sensor constituted of a gyroscope and so forth. The attitude detector 45 detects the attitude relative to a direction of gravitation force to send an attitude detection signal to the CPU 30. On the basis of the attitude detection signal, the CPU 30 controls the EEPROM 37 and the LCD driver 34 to perform various operations of frame advance, frame return and so forth of the image data displayed on the LCD 8. Incidentally, the attitude detector 45 is not limited to the gyroscope, and may be a sensor for detecting the relative attitude concerning the cradle 12.

Meanwhile, the EEPROM 37 also stores various control programs, setting information and so forth. The CPU 30 reads the information from the EEPROM 37 to the RAM 33, which is a working memory, to execute various processes.

In the cradle 12, a transmitting circuit 48 is connected to the connector 16 and a primary coil 49 is connected to the transmitting circuit 48. Electric power is supplied from the external power source to the transmitting circuit 48 via the power cable 15 and the connector 16. Upon reception of the electric power, the transmitting circuit 48 passes a frequency signal through the primary coil 49, which is contained in the projection 14 to generate the alternating magnetic field. When the hook portion 4 of the electronic camera 2 engages with the projection 14, the alternating magnetic field generated by the primary coil 49 is magnetically coupled with the secondary coil 47, which is built in the hook portion 4, by electromagnetic induction to cause the electromotive force in the secondary coil 47. By the way, the projection 14 may be provided with a sensor for detecting the engagement of the hook portion 4, and the transmitting circuit 48 may pass the frequency signal through the primary coil 49 only when the hook portion 4 engages with the projection 14.

The cradle 12 further comprises a radio transceiver 50, a storage part 51 and a recorder/reproducer 52. The radio transceiver 50 performs radio data communication with the radio transceiver 43 of the electronic camera 2. The storage part 51 is a memory having much larger capacity than the EEPROM 37 of the electronic camera 2. The recorder/reproducer 52 records the data in the storage part 51 and reads the data therefrom. As to the storage part 51, a semiconductor memory device of EEPROM and so forth is used, for example. However, this is not exclusive. A magnetic disk device of a hard disk and so forth may be used.

It is possible to perform bi-directional data communication between the electronic camera 2 and the cradle 12. When the data is transferred from the electronic camera 2 to the cradle 12, the radio transceiver 50 receives the image data and the sound data from the radio transceiver 43 of the electronic camera 2, and the recorder/reproducer 52 writes this data in the storage part 51. Meanwhile, when the data is transferred from the cradle 12 to the electronic camera 2, the recorder/reproducer 52 reads the image data and the sound data recorded in the storage part 51, and the radio transceiver 50 converts the read data into the radio signal. After that, the radio signal is transmitted to the radio transceiver 43 of the electronic camera 2. Incidentally, the data communication is commenced by operating the operation button 9 in a predetermined manner. However, the data communication may be automatically performed upon engagement of the hook portion 4 with the projection 14.

An operation of the portable electronics device support system having the above structure is described below. First of all, the power button 10 is operated to turn on the electronic camera 2 when an image is taken in a state that the electronic camera 2 is removed from the cradle 12. Upon this operation, the LED 7 is turned on and the LCD 8 displays a menu picture. The still-image shooting mode or the moving-image shooting mode is selected from the menu by means of the operation button 9. And then, a shooting operation is commenced to display a through image on the LCD 8. At this time, a zooming operation of the taking lens 21 is also performed. Since the electronic camera 2 has the above-described shape, a person taking an image can use the hook portion 4 as a grip by grasping the hook portion 4 so as to face the LCD 8. It is possible to handle the operation button 9 with a thumb.

In the case of the still-image shooting mode, the taking lens 21 is directed to a subject and the operation button 9 is pressed by half to perform various shooting preparation processes of automatic exposure adjustment (AE), automatic focusing adjustment (AF) and so forth. In this state, the operation button 9 is further pressed (fully pressed). Thereupon, the image pickup signal of one frame, for which the shooting preparation processes have been performed, is converted into the image data. After that, image processing and compression processing are performed for the image data, and the processed image data is recorded in the EEPROM 37.

In the case of the moving-image shooting mode, the taking lens 21 is directed to a subject and the operation button 9 is fully pressed to commence shooting of the moving image. Until the operation button 9 is fully pressed again, the image data is captured at a prescribed frame rate (thirty frames per second, for example). Moreover, surround sound is simultaneously recorded via the microphone 5. The sound collected by the microphone 5 is recorded in the EEPROM 37 so as to relate to the image data.

After shooting the still image or the moving image, the operation button 9 is operated along the instructions of the menu picture, which is displayed on the LCD 8, to set the electric camera 2 in a reproduction mode. It is possible to properly reproduce the still-image data, the moving-image data and the sound data recorded in the EEPROM 37.

Next, the electronic camera 2 is put on the cradle 12 attached to a wall. Thereupon, the electromotive force is caused in the secondary coil 47 by the electromagnetic induction of the primary coil 49 to charge the rechargeable battery 44. Charging the battery 44 is performed regardless of the on-state and the off-state of the electronic camera 2. Upon handling the operation button 9 in a predetermined manner and in a state that the electronic camera 2 is turned on, the taken image data and the sound data are transferred to the cradle 12 by radio. The transferred data is recorded in the storage part 51 of the cradle 12.

Moreover, by performing a predetermined operation for the operation button 9 in the state that the electronic camera 2 is put on the cradle 12, the image data and the sound data recorded in the storage part 51 are reproduced. At this time, the data is transferred from the cradle 12 to the electronic camera 2 by radio. And then, the image data of the still image and the moving image is displayed on the LCD 8, and the sound data is outputted from the speaker 11. Incidentally, it is possible to properly change a direction for displaying the image data on the LCD 8.

Figure 5A:
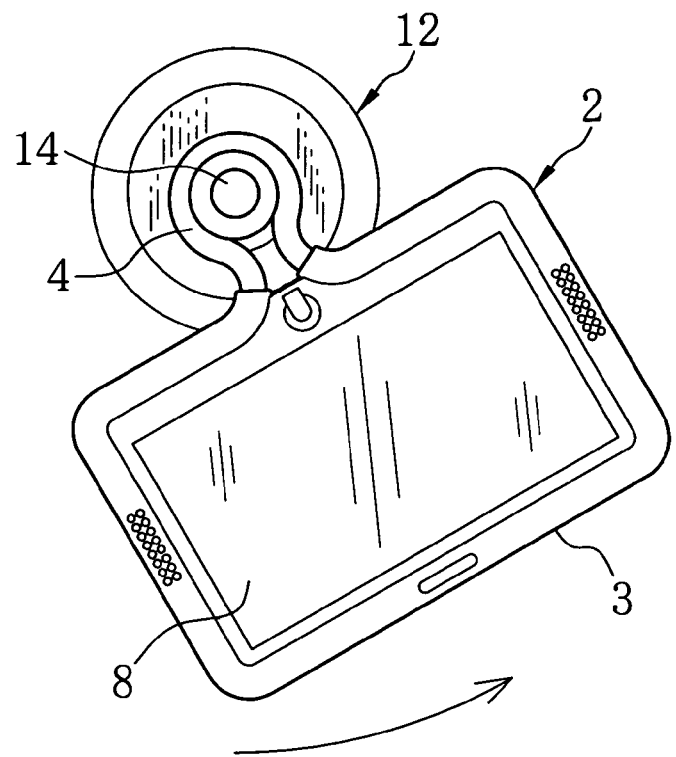
FIG. 5A is an illustration showing the electronic camera rotated in a counterclockwise direction.
Figure 5B:
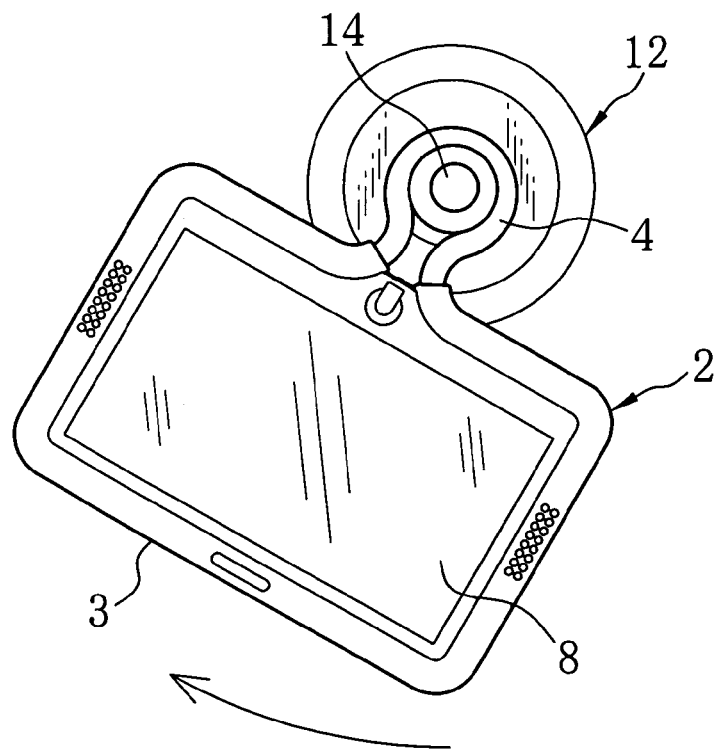
FIG. 5B is an illustration showing the electronic camera rotated in the clockwise direction.

Such as shown in FIG. 5A, for example, the electronic camera 2 is rotated in a counterclockwise direction by a predetermined angle when the still-image data is reproduced. This rotation is detected by the attitude detector 45 to perform the frame advance from the image data, which is currently displayed on the LCD 8, to the succeeding image data. Meanwhile, such as shown in FIG. 5B, when the electronic camera 2 is rotated in a clockwise direction by a predetermined angle, the attitude detector 45 detects this rotation to perform the frame return from the image data, which is currently displayed on the LCD 8, to the preceding image data.

When the attitude shown in FIG. 5A is taken at the time of reproducing the moving-image data, the moving image displayed on the LCD 8 is fast-forwarded. When the attitude shown in FIG. 5B is taken at this time, the moving image displayed on the LCD 8 is rewound. Besides this kind of the image-reproducing operation, it is possible to perform the other image-reproducing operations of stop, temporary stop, slow reproduction and so forth. In this way, the electronic camera 2 is capable of performing the charging operation and the reproducing operations when suspended on the wall.

In the above embodiment, charging the electronic camera 2 from the cradle 12 is performed in the electrically noncontact manner. Further, the data communication is performed between the electronic camera 2 and the cradle 12 also in the electrically noncontact manner. The present invention, however, is not limited to this. The charging operation and the data communication may be performed in a state that the electronic camera 2 and the cradle 12 are electrically contacted with each other by electric contact points provided thereon.

In the above embodiment, the hook portion 4 of the electronic camera 2 is formed in the circular shape. The present invention, however, is not limited to this. It is sufficient that the hook portion 4 merely has an opening into which the projection 14 of the cradle 12 is inserted. The shape of the hook portion 4 may be properly changed. Moreover, it is sufficient that the projection 14 is inserted into the opening area 4a of the hook portion 4 to suspend the electronic camera 2. The shape of the projection 14 may be properly changed.

In the above embodiment, the electronic camera 2 is described as a portable electronics device. However, the present invention is not limited to this, and may be adoptable to the other portable electronics devices of PDA (Personal Digital Assistance), a cell-phone, a mobile monitor and so forth. The imaging portion is not always necessary.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A portable electronics device support system comprising:
    a portable electronics device having a flat body and a hook portion protruding from said body, said body including at least a display, a rechargeable battery, a memory and a controller;
    a cradle including a projection with which said hook portion is capable of engaging, said cradle performing electric supply for said rechargeable battery and performing bi-directional data communication with said portable electronics device regarding data to be reproduced on said display, wherein said portable electronics device includes an attitude detector for detecting an attitude of said portable electronics device relative to direction of gravitational force.

2. A portable electronics device support system according to claim 1, wherein said cradle further includes a storage part for storing the data transferred from said portable electronics device by said data communication, said storage part having larger capacity than said memory of said portable electronics device.

3. A portable electronics device support system according to claim 1, wherein said cradle is connected with a power cable via which electric power is supplied from the outside.

4. A portable electronics device support system according to claim 1, wherein a reproducing operation of an image to be reproduced on said display is controlled in accordance with the attitude of said portable electronics device detected by said attitude detector.

5. A portable electronics device support system according to claim 1, wherein said display is surrounded by a shock absorber.

6. A portable electronics device support system according to claim 1, wherein said body of said portable electronics device has a rectangular shape, and said hook portion protrudes from a central portion of one side of said body in a loop shape.

7. A portable electronics device support system comprising:
    a portable electronics device having a flat body and a hook portion protruding from said body, said body including at least a display, a rechargeable battery, a memory and a controller; and
    a cradle including a projection with which said hook portion is capable of engaging, said cradle performing electric supply for said rechargeable battery and performing bi-directional data communication with said portable electronics device regarding data to be reproduced on said display, wherein said body of said portable electronics device has a rectangular shape, and said hook portion protrudes from a central portion of one side of said body in a loop shape, and the top of said projection expands in a flange shape to prevent said hook portion from dropping out of said projection.

8. A portable electronics device support system according to claim 7, wherein said portable electronics device is an electronic camera.

9. A portable electronics device support system according to claim 8, wherein said hook portion is used as a grip for grasping said electronic camera at a shooting time.

10. A portable electronics device support system according to claim 9, wherein said display is a liquid crystal display.

11. A portable electronics device support system according to claim 10, wherein said body is provided with a microphone, sound data obtained by said microphone being transferred from said electronic camera to said cradle by said data communication.

12. The portable electronics device support system according to claim 1, wherein the attitude detector includes a gyroscope.

13. The portable electronics device support system according to claim 1, wherein the attitude detector includes a sensor for detecting relative attitude concerning the cradle.

14. The portable electronics device support system according to claim 1, wherein the rechargeable battery is located within the body.

* * * * *